United States Patent
Meritt

(10) Patent No.: US 10,520,379 B2
(45) Date of Patent: Dec. 31, 2019

(54) WALL SHEAR SENSORS WITH MULTIPLE INDEPENDENT FLEXURES AND MEASUREMENT SYSTEMS INCLUDING THE WALL SHEAR SENSORS

(71) Applicant: Ahmic Aerospace, LLC, Beavercreek, OH (US)

(72) Inventor: Ryan James Meritt, Beavercreek, OH (US)

(73) Assignee: Ahmic Aerospace, LLC, Beavercreek, OH (US)

( * ) Notice: Subject to any disclaimer, the term of this patent is extended or adjusted under 35 U.S.C. 154(b) by 0 days.

(21) Appl. No.: 15/722,749

(22) Filed: Oct. 2, 2017

(65) Prior Publication Data

US 2018/0094994 A1    Apr. 5, 2018

Related U.S. Application Data

(60) Provisional application No. 62/402,192, filed on Sep. 30, 2016.

(51) Int. Cl.
*G01L 5/16* (2006.01)
*G01L 1/22* (2006.01)
(Continued)

(52) U.S. Cl.
CPC ............... *G01L 5/161* (2013.01); *G01L 1/16* (2013.01); *G01L 1/18* (2013.01); *G01L 1/2262* (2013.01)

(58) Field of Classification Search
CPC ...... G01B 11/165; G01B 11/18; G01D 5/353; G01N 3/24; G01N 2203/0623;
(Continued)

(56) References Cited

U.S. PATENT DOCUMENTS 3,464,259 A * 9/1969 Farr .................. G01B 7/18
338/6
4,112,752 A    9/1978 Hafner et al.
(Continued)

OTHER PUBLICATIONS

"Direct Measurement of Skin Friction in Complex Flows", Schetz, Joseph A., 2010, American Institute of Aeronautics and Astronautics.

(Continued)

*Primary Examiner* — Brandi N Hopkins
(74) *Attorney, Agent, or Firm* — Dinsmore & Shohl, LLP

(57) ABSTRACT

A wall shear sensor includes a floating element fixedly attached to a base. The floating element has a sensing head opposite the base, a first flexure between the sensing head and the base, and a second flexure between the first flexure and the base. The wall shear sensor further includes at least one strain gauge coupled to the first flexure to measure a first directional component of wall shear stresses applied across a head surface of the sensing head; and at least one strain gauge coupled to the second flexure to measure a second directional component of wall shear stresses applied across the floating element surface of the sensing head, the second component being different from the first component. The wall shear sensors thus measure both magnitude and direction of wall shear. Wall shear measurement systems include at least one wall shear sensor within a sensor housing.

20 Claims, 11 Drawing Sheets

(51) Int. Cl.
*G01L 1/18* (2006.01)
*G01L 1/16* (2006.01)

(58) Field of Classification Search
CPC .............. G01N 13/00; G01N 2013/0216;
G01L 1/246; G01L 1/24; G01G 3/00;
G01G 21/00; G01M 1/12; F24F 6/02;
F24F 2110/00; F24F 6/025; F24F 11/30;
G05D 22/02; G05D 9/12
See application file for complete search history.

(56) References Cited

U.S. PATENT DOCUMENTS

| | | | |
|---|---|---|---|
| 4,240,290 A | 12/1980 | Montoya et al. | |
| 4,283,941 A | 8/1981 | Kutsay | |
| 4,290,302 A | 9/1981 | Harris | |
| 4,364,280 A | 12/1982 | Kutsay | |
| 4,448,083 A | 5/1984 | Hayashi | |
| 4,464,928 A | 8/1984 | Dealy | |
| 4,485,681 A | 12/1984 | Hatamura | |
| 4,573,362 A * | 3/1986 | Amlani | G01L 1/2218 73/862.044 |
| 4,604,903 A | 8/1986 | Tcheng et al. | |
| 4,674,339 A | 6/1987 | Hatamura et al. | |
| 4,836,035 A | 6/1989 | Tcheng et al. | |
| 5,889,214 A | 3/1999 | Kang et al. | |
| 6,225,576 B1 | 5/2001 | Poole et al. | |
| 6,260,424 B1 * | 7/2001 | Koelblinger | F24F 6/02 73/862.632 |
| 6,426,796 B1 | 7/2002 | Pulliam et al. | |
| 7,770,463 B2 | 8/2010 | Sheverev et al. | |
| 7,784,363 B2 * | 8/2010 | Ihrke | B25J 13/084 73/862.041 |
| 7,921,731 B2 | 4/2011 | Bajikar et al. | |
| 8,276,463 B2 | 10/2012 | Sheverev et al. | |

OTHER PUBLICATIONS

"Practical Strain Gage Measurements", Agilent Technologies, 1999.

* cited by examiner $$\tau_{wx} = sin(\epsilon) \cdot \tau_w$$
$$\tau_{wy} = cos(\epsilon) \cdot \tau_w \qquad \tau_w = \sqrt{\tau_{wx}^2 + \tau_{wy}^2}$$
$$tan(\epsilon) = \frac{\tau_{wy}}{\tau_{wx}}$$

$\epsilon$: Cross-flow Angle
$\tau_w$: Resultant/Total wall shear
$\tau_{wy}$: stream-wise wall shear
$\tau_{wx}$: transverse flow wall shear

WALL SHEAR SENSORS WITH MULTIPLE INDEPENDENT FLEXURES AND MEASUREMENT SYSTEMS INCLUDING THE WALL SHEAR SENSORS

CROSS REFERENCES TO RELATED APPLICATIONS

This application claims the benefit of priority under 35 U.S.C. § 119(e) to U.S. Provisional Application Ser. No. 62/402,192, filed Sep. 30, 2016, which is incorporated herein by reference in its entirety.

TECHNICAL FIELD

This disclosure relates to wall shear sensors and wall shear measurement systems and, more particularly, to wall shear sensors having multiple independent flexures and systems incorporating the wall shear sensors.

BACKGROUND

Accurate knowledge of wall shear stress ($\tau_w$), or skin friction ($C_f$), can be a tool for assessing the performance and survivability of aerodynamic and hydrodynamic systems. Experimental wall shear is also an important measurement needed to anchor, validate, and verify analytical and computation methods including their submodels. Skin friction is often expressed as a dimensionless coefficient of wall shear stress. Skin friction drag may be determined directly or indirectly. Measurement techniques for skin friction are distinguished by their approaches and the physical quantities that they measure. Indirect methods require the properties of the flow and boundary layer to be well-defined. Through analytical correlation or analogy, shear at the wall is subsequently solved for as a function of other flowfield measurements. For example, the Reynolds Analogy is used to infer skin friction from a measurement of surface heat flux.

Although indirect techniques have been shown to work in many common, well-understood flow environments, they are not considered reliable in complex flowfields. In contrast, direct methods do not require any foreknowledge, but instead directly measure the tangential frictional forces imparted by the moving flow. Conventional wall shear sensors are capable of measuring such forces but in general suffer from decreased reliability and accuracy when flow over the sensor is variable in direction or in both direction and magnitude. Particularly when a conventional wall shear sensor has an optimal orientation, even a slight misalignment of the conventional wall shear sensor's orientation or a change in the flow direction can result in significantly inaccurate measurements. Therefore, needs exist for reliable apparatus that directly measure both the direction and the magnitude of wall shear acting on the sensor in an accurate manner.

SUMMARY

Embodiments disclosed in this specification are directed to wall shear sensors. The wall shear sensors according to embodiments are based on a modification to a single bending beam wall shear sensor that incorporates multiple, independent flexure components. A sensor having multiple non-coplanar measurement flexure components is capable of accurately determining flow direction and also measuring the wall shear magnitude.

According to some embodiments, a wall shear sensor includes a floating element fixedly attached to a base. The floating element has a sensing head opposite the base, a first flexure between the sensing head and the base, and a second flexure between the first flexure and the base. The wall shear sensor further includes at least one strain gauge coupled to the first flexure to measure a first directional component of wall shear stresses applied across a head surface of the sensing head; and at least one strain gauge coupled to the second flexure to measure a second directional component of wall shear stresses applied across the floating element surface of the sensing head. The first flexure may be oriented parallel to a first transverse axis of the floating element, and the second flexure may be oriented parallel to a second transverse axis of the floating element. The first transverse axis and the second transverse axis define an offset angle from greater than 0° to less than 180°.

According to further embodiments, a wall shear measurement system includes a test body having a flow surface; at least one sensor housing mounted to the test body; and a wall shear sensor in the at least one sensor housing. The wall shear sensor may include a floating element fixedly attached to a base, the floating element having a sensing head opposite the base, a first flexure between the sensing head and the base, and a second flexure between the first flexure and the base; and at least one strain gauge coupled to the first flexure to measure a first directional component of wall shear stresses applied across a floating element surface of the sensing head; and at least one strain gauge coupled to the second flexure to measure a second directional component of wall shear stresses applied across the floating element surface of the sensing head. The first flexure may be oriented along a first transverse axis of the floating element. The second flexure may be oriented along a second transverse axis of the floating element. The first transverse axis and the second transverse axis define an offset angle from greater than 0° to less than 180°. The sensor housing laterally surrounds the floating element. An interior space laterally surrounding the floating element is defined between the floating element and the sensor housing. The interior space includes a small gap portion laterally surrounding the sensing head of the floating element. The head surface of the sensing head is exposed outside the sensor housing.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments of this disclosure include wall shear sensors and wall shear measurement systems including at least one wall shear sensor. The wall shear sensors include a floating element having multiple flexures oriented parallel to at least two different axes. Strain measurements may be acquired from each of the multiple flexures. The strain measurements from the multiple flexures may be analyzed to provide both magnitude and direction of wall shear over a head surface of the floating element. The wall shear sensors according to embodiments herein may be suitable for various applications including, but not limited to, the sensing of wall shear over a flow surface such as an aircraft or maritime vehicle.

Figure 1:
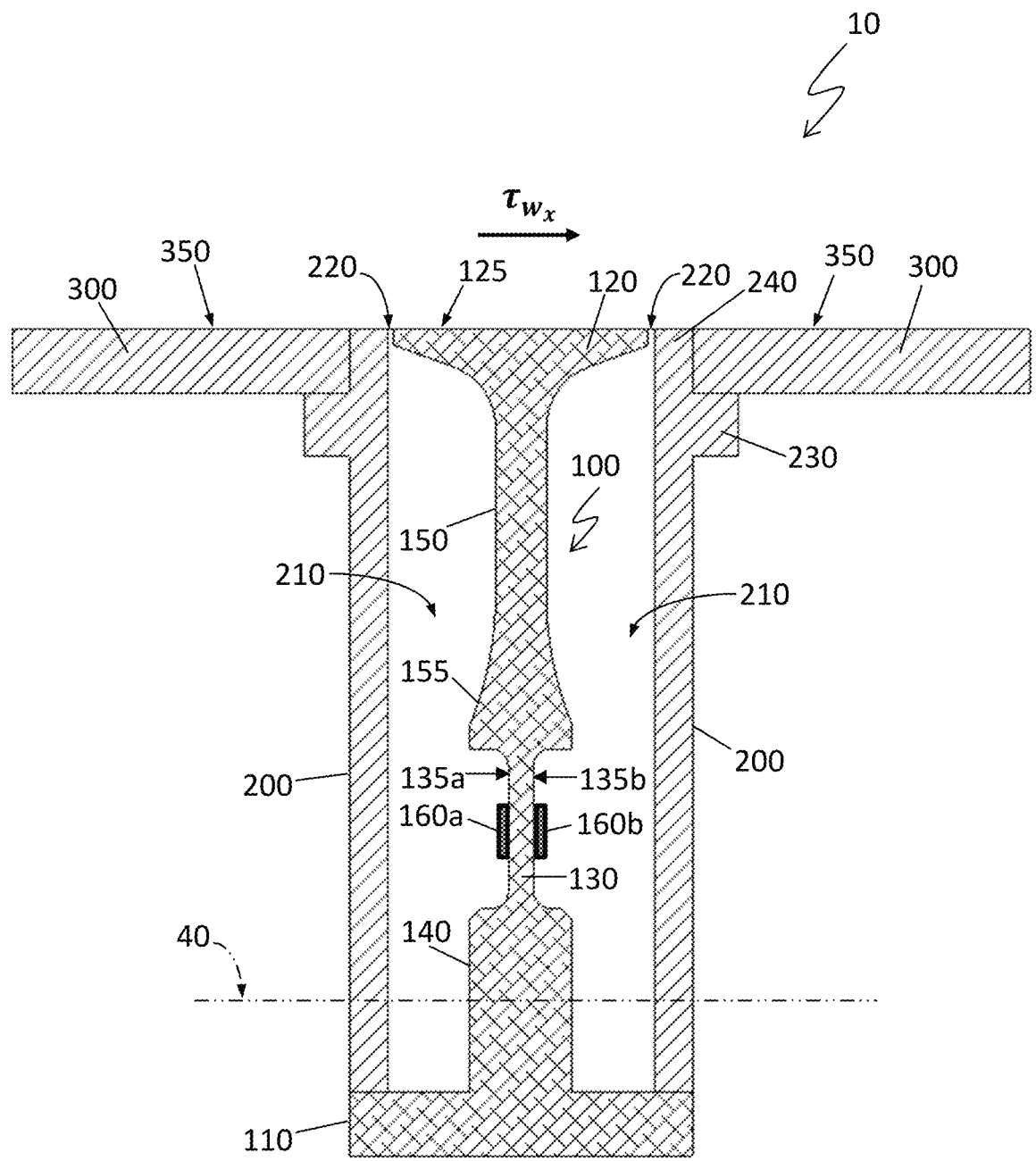
FIG. 1 is a cross-sectional front view of a wall shear sensor according to one or more embodiments described herein.
Figure 2:
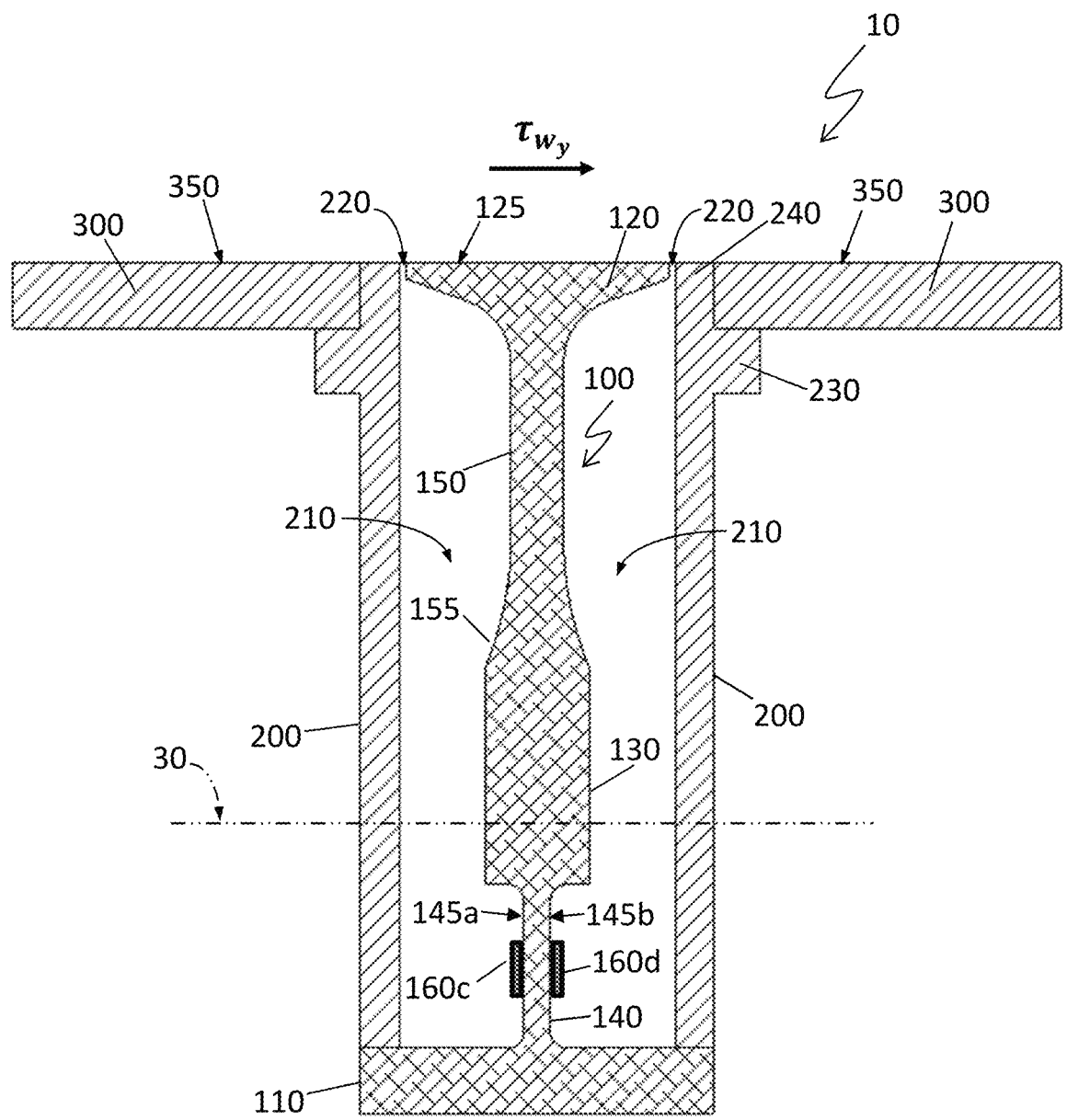
FIG. 2 is a cross-sectional side view of the wall shear sensor of FIG. 1.
Figure 3:
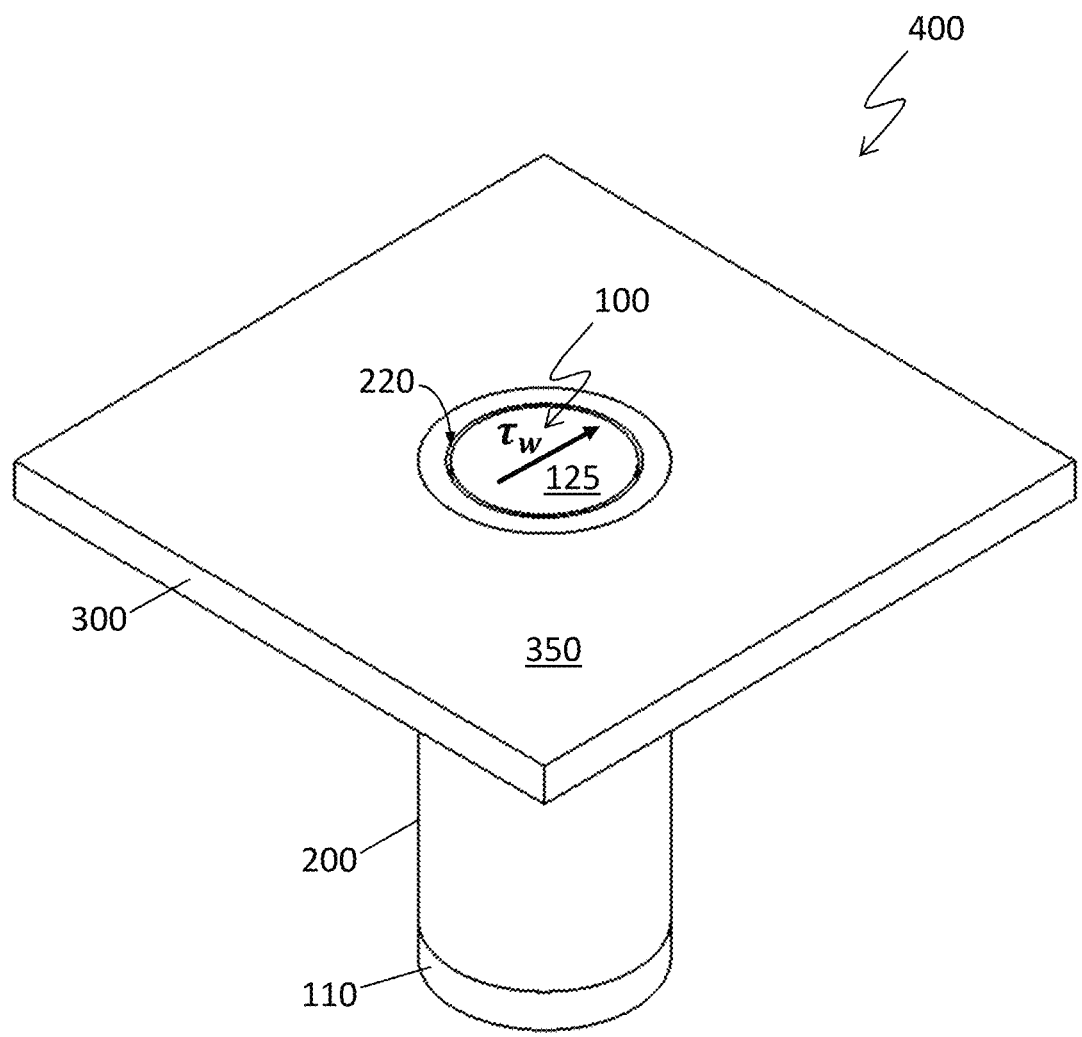
FIG. 3 is a perspective view of the wall shear sensor of FIG. 1 inside a sensor housing that is mounted to a test body having a flow surface.

Referring to FIGS. 1-3, a wall shear sensor 10 according to embodiments includes a floating element 100 and a plurality of strain gauges 160a, 160b, 160c, 160d coupled to the floating element 100 to measure a strain on a portion of the floating element 100. In some embodiments, the floating element 100 may be disposed within a sensor housing 200 that laterally surrounds the floating element 100. When the floating element 100 is within a sensor housing 200, an interior space 210 may be defined between the floating element 100 and the sensor housing 200, thus laterally surrounding the floating element 100. The interior space 210 includes a small gap portion 220 laterally surrounding the sensing head 120 of the floating element 100. The head surface 125 of the sensing head 120 is exposed outside the sensor housing 200 to fluids such as a gas flow, an air flow, or a liquid flow that pass over the head surface 125 during a wall shear measurement. In some embodiments, the wall shear sensor 10 including the floating element 100 housed within the sensor housing 200 may be mounted to a test body 300 having a flow surface 350. The mounting of the wall shear sensor 10 may be facilitated by a mounting flange 230 and a protective collar 240 of the sensor housing 200. In some embodiments, the wall shear sensor 10 is mounted to the test body 300 such that the head surface 125 of the floating element 100 is coplanar or substantially coplanar with the flow surface 350.

The head surface 125 of the floating element 100 may have any shape that enables the floating element 100 to sway or bend when a wall shear is applied across the head surface 125. In example embodiments, the head surface 125 may be shaped as a square, rectangle, circle, or an oval, for example. In some embodiments, the head surface 125 is circular. In some illustrative applications, it may be suitable for a head surface 125 that is circular to have a diameter from about 0.25 inches to about 0.75 inches. However, it should be understood that the diameter of such a head surface 125 may be substantially smaller than 0.25 inches or substantially larger than about 0.75 inches.

Figure 4:
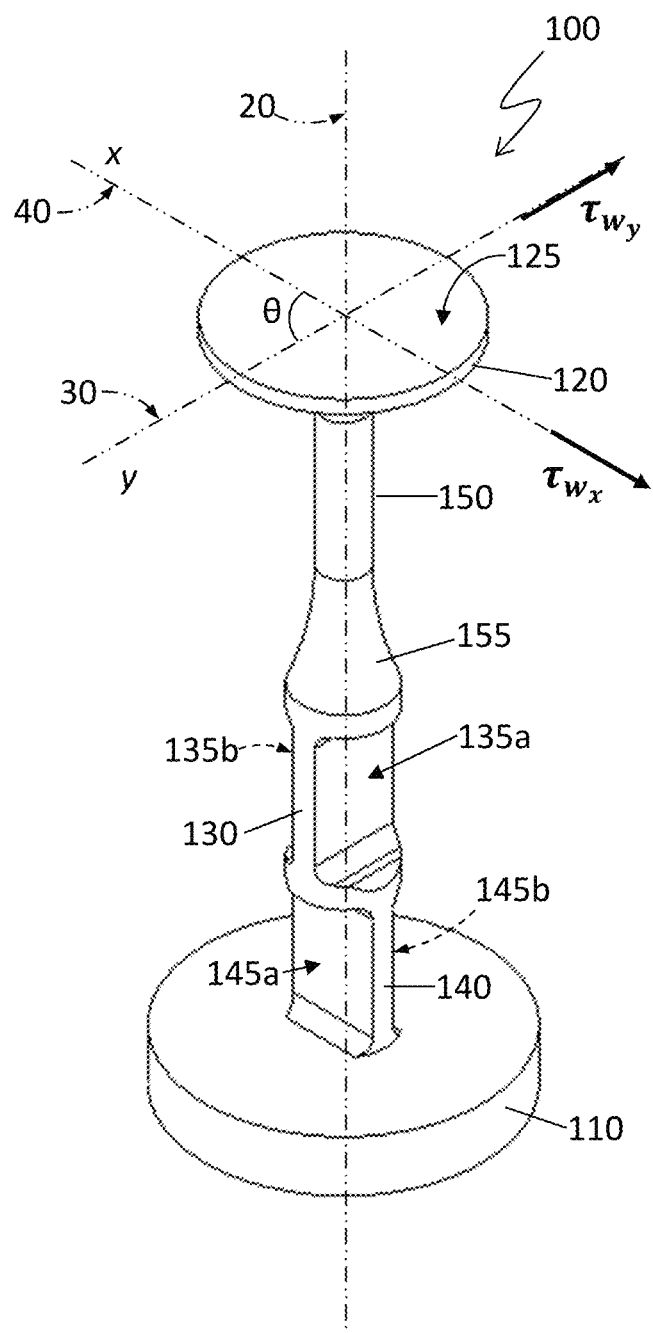
FIG. 4 is an isometric perspective view of a floating element of a wall shear sensor according to one or more embodiments described herein.

Referring to FIG. 4, the floating element 100 is fixedly attached or mounted to a base 110. The floating element 100 and the base 110 may be a unitary component that is manufactured as a single part or may be two components that are joined together by any suitable method. A longitudinal axis 20 of the floating element 100 is defined perpendicular to the base 110 in the lengthwise direction of the floating element 100. The floating element 100 includes a sensing head 120 opposite the base 110. The sensing head 120 includes a head surface 125. The head surface 125 may be disposed within a plane perpendicular to the longitudinal axis 20 of the floating element 100.

As used herein, the term "transverse axis" refers to any axis perpendicular to the longitudinal axis 20 of the floating element 100. Both a first transverse axis 30 of the floating element 100 and a second transverse axis 40 of the floating element 100 are defined perpendicular to the longitudinal axis 20 of the floating element 100. The first transverse axis 30 and the second transverse axis 40 define an offset angle θ greater than 0° and less than 180°, or from greater than 0° to 90°, or from 30° to 150°, or from 45° to 135°, or from 60° to 120°, or about 90°, or exactly 90°. Though in the embodiments of FIGS. 1, 2, 4, 5A, and 5B, the offset angle θ is exactly 90°, it should be understood that these embodiments are merely illustrative of one example configuration.

Figure 5A:
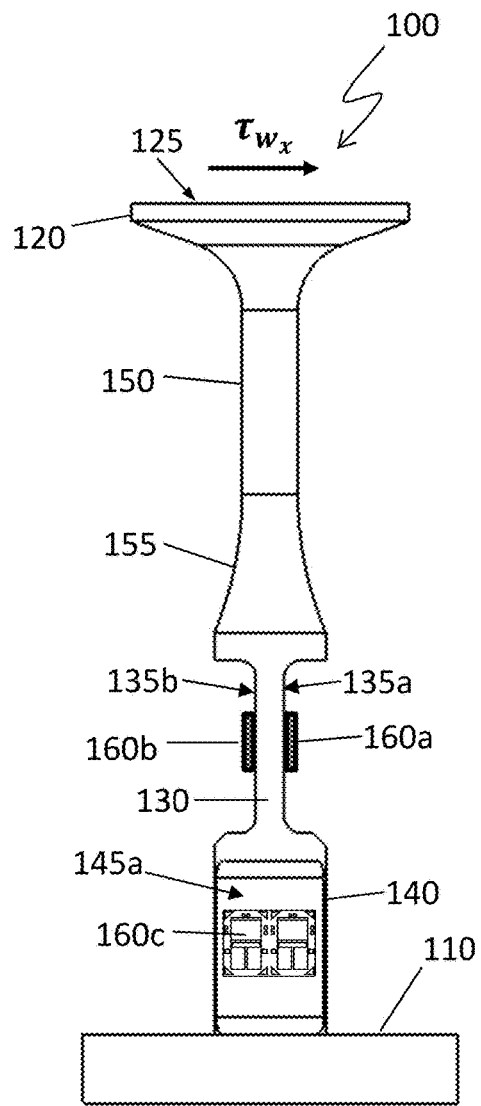
FIG. 5A is a front view of a floating element of a wall shear sensor according to one or more embodiments described herein.
Figure 5B:
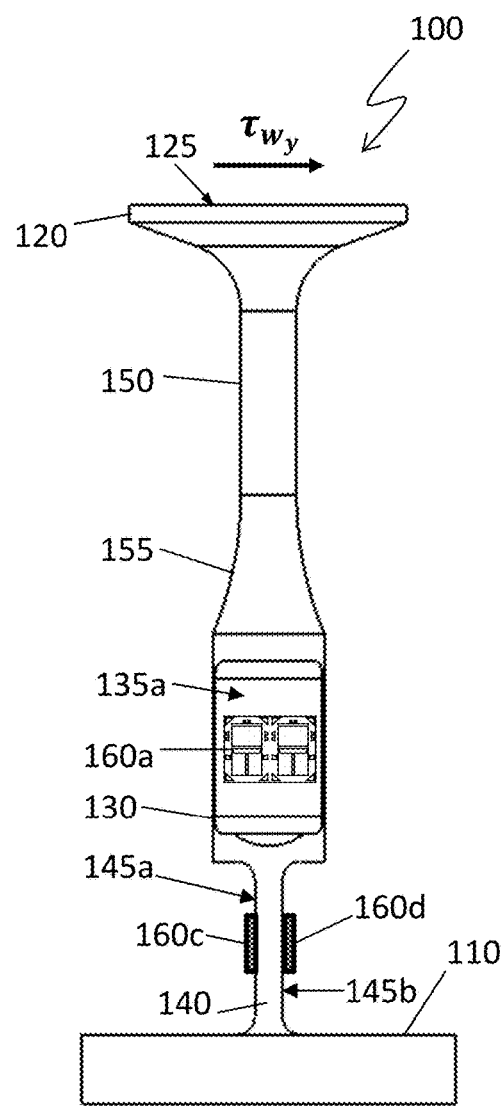
FIG. 5B is a side view of the floating element of FIG. 5A.

Referring to FIGS. 4, 5A, and 5B, the floating element 100 further includes a first flexure 130 along the longitudinal axis 40 between the sensing head 120 and the base 110, and a second flexure 140 along the longitudinal axis 40 between the first flexure 130 and the base 110. In embodiments not shown, optionally the floating element 100 may further include at least one additional flexure between the second flexure 140 and the base 110.

The first flexure 130 is oriented parallel to the first transverse axis 30 of the floating element 100. Thus, the first flexure 130 is a portion of the floating element 100 that enables the floating element 100 to sway or pivot in a direction perpendicular to the first transverse axis 30 of the floating element 100 when a shear force having a directional component perpendicular to the first transverse axis 30 is applied across the head surface 125. The first flexure 130 may include a first front surface 135*a* and a first rear surface 135*b* opposite the first front surface 135*a*. The first front surface 135*a* and the first rear surface 135*b* may be in planes parallel to the first transverse axis 30 and may be parallel to each other.

The second flexure 140 is oriented parallel to the second transverse axis 40 of the floating element 100. Thus, the second flexure 140 is a portion of the floating element 100 that enables the floating element 100 to sway or pivot in a direction perpendicular to the second transverse axis 40 of the floating element 100 when a shear force having a directional component perpendicular to the second transverse axis 40 is applied across the head surface 125. The second flexure 140 may include a second front surface 145*a* and a second rear surface 145*b* opposite the second front surface 145*a*. The second front surface 145*a* and the second rear surface 145*b* may be in planes parallel to the first transverse axis 30 and may be parallel to each other.

In embodiments for which an optional additional flexure is present between the second flexure 140 and the base 110, the additional flexure may be oriented parallel to the first transverse axis 30 or to the second transverse axis 40. Alternatively, the the additional flexure may be oriented parallel to a third transverse axis offset by a desired angle from both the first transverse axis 30 and the second transverse axis 40. For example, the first transverse axis 30 may be offset 90° from the second transverse axis 40, and the third transverse axis may be offset 45° from both the first transverse axis 30 and the second transverse axis 40.

In the embodiment of FIG. 4, the first flexure 130 and the second flexure 140 are portions of the floating element 100 having substantially rectangular cross sections with respective widths substantially less than their respective lengths. It should be understood that the floating element may have flexures with shapes or cross sections other than those of the embodiment of FIG. 4, which is intended to be illustrative of only one specific configuration.

Optionally, the floating element may include a neck portion 150 along the longitudinal axis 40 between the sensing head 120 and the first flexure 130. When present, the floating element 100 optionally may include a flared portion 155 along the longitudinal axis 40 between the neck portion 150 and the first flexure 130. It should be understood that the floating element 100 of FIG. 4 is an illustrative embodiment only and that multiple configurations of the floating element 100 are possible, provided that such alternate configurations include at least a first flexure and a second flexure.

Still referring to FIGS. 4, 5A, and 5B, the wall shear sensor 10 further includes at least one strain gauge 160*a*, 160*b* (omitted from FIG. 4 for the sake of clarity) coupled to the first flexure 130 to measure a first directional component of wall shear applied across the head surface 125 of the sensing head 120. In some embodiments, the at least one strain gauge 160*a*, 160*b* coupled to the first flexure 130 measures a first directional component of forces that result from the wall shear applied across the head surface 125 of the sensing head 120. The wall shear sensor 10 further includes at least one strain gauge 160*c*, 160*d* (omitted from FIG. 4 for the sake of clarity) coupled to the second flexure 140 to measure a second directional component of wall shear applied across the head surface 125 of the sensing head 120. In some embodiments, the at least one strain gauge 160*c*, 160*d* coupled to the second flexure 140 measures a second directional component of forces that result from the wall shear applied across the head surface 125 of the sensing head 120. The first flexure 130 is oriented parallel to a first transverse axis 30 of the sensing head 120. The second flexure 140 is oriented parallel to a second transverse axis 40 of the sensing head 120. The first transverse axis 30 and the second transverse axis 40 define an offset angle θ greater than 0° and less than 180°, or from greater than 0° to 90°, or from 30° to 150°, or from 45° to 135°, or from 60° to 120°, or about 90°, or exactly 90°, including any specific angle in any of the foregoing ranges, as well as any subset of any of the foregoing ranges.

The first flexure 130 and the second flexure 140 may have any geometry or proportion that enable the floating element 100 to bend or flex when a wall shear is applied across the head surface 125 of the sensing head 120. In some embodiments, the first flexure 130 may include a first front surface 135*a* and a second rear surface 135*b* opposite the second front surface 135*a*. Similarly, the second flexure 140 may include a second front surface 145*a* and a second rear surface 145*b* opposite the second front surface 145*a*. In some embodiments, at least one strain gauge 160*a*, 160*b* may be coupled to or mounted on either the first front surface 135*a* or the first rear surface 135*b* of the first flexure 130 and at least one strain gauge 160*c*, 160*d* may be coupled to or mounted on either the second front surface 145*a* or the second rear surface 145*b* of the second flexure 140.

In some embodiments, at least one strain gauge 160*a* may be coupled to or mounted on the first front surface 135*a* of the first flexure 130; at least one strain gauge 160*b* may be coupled to or mounted on the first rear surface 135*b* of the first flexure 130; at least one strain gauge 160*c* may be coupled to or mounted on the second front surface 145*a* of the second flexure 140; and at least one strain gauge 160*d* may be coupled to or mounted on the second rear surface 145*b* of the second flexure 140. In general, specific strain gauge configuration strategies may include, without limitation, one strain gauge per flexure, two strain gauges per flexure with one strain gauge on each side of the flexure, or four strain gauges per flexure with two strain gauges on each side of the flexure. In some embodiments, at least one of the strain gauges 160*a*, 160*b*, 160*c*, 160*d* may be positioned on its respective surface where strain is known or expected to be most concentrated.

The strain gauges 160*a*, 160*b*, 160*c*, 160*d* may be any passive or active electronic device capable of producing an electric signal proportional to an amount of strain present at the surface to which the strain gauge is mounted or attached. The strain gauges 160*a*, 160*b*, 160*c*, 160*d* are adapted to produce an electrical signal when the head surface 125 of the floating element 100 is exposed to wall shear. The electrical signal arises from the resulting force or moment experienced by the head surface 125. When the floating element 100 laterally deflects, the electrical signal produced from the one or more strain gauges 160*a*, 160*b*, 160*c*, 160*d* may be interpreted to determine the wall shear. In some embodiments, the electrical signal is a change in the electrical resistance of the one or more strain gauges 160*a*, 160*b*, 160*c*, 160*d* that is measurable with a Wheatstone bridge. As the first flexure 130 and the second flexure 140 bend or sway, one or more strain gauges 160*a*, 160*b*, 160*c*, 160*d* mounted to the first flexure 130 and the second flexure 140 are deformed, thereby resulting in the change in electrical resistance.

It should be understood that interpretation of the electrical signals may require an initial empirical calibration of the wall shear sensor 10, whereby determination of the applied force requires a correlation of an actual measurement to the empirical calibration. In non-limiting examples, the strain gauges 160*a*, 160*b*, 160*c*, 160*d* may include semiconductor strain gauges, foil strain gauges, piezoelectric elements, piezoresistive elements, microelectromechanical (MEM) devices, capacitors, or combinations thereof. The strain gauges 160*a*, 160*b*, 160*c*, 160*d* may be configured in one or more Wheatstone bridges or may be configured in quarter-bridge, half-bridge, or full-bridge arrangements with dummy resistors, depending on the number of strain gauges present.

Materials used in the floating element 100, including the first flexure 130 and the second flexure 140, may include conventional transducer spring element materials that are constructed from or include, for example, 20XX/60XX/70XX aluminum alloys, BeCu, 6Al-4V titanium, 410/63X/S15500 stainless steel, and other durable alloys or combinations thereof. In some non-limiting examples, the floating element 100, including the first flexure 130 and the second flexure 140, may also be made from lighter magnesium alloys, ceramics, or plastics, for example. However, it should be understood that the floating element 100, including the first flexure 130 and the second flexure 140, may include or be made from materials substantially different than those listed, provided the wall shear sensor 10 operates according to the same general principles described in the embodiments of this disclosure.

The wall shear sensor 10 may further include a sensor housing 200 that laterally surrounds the floating element 100. Thereby, an interior space 210 laterally surrounding the floating element 100 is defined between the floating element 100 and the sensor housing 200. The interior space 210 includes a small gap portion 220 laterally surrounding the sensing head 120 of the floating element 100. The small gap portion 220 is sufficiently wide to provide freedom for the floating element 100 to laterally deflect or "float" as a result of wall shear that are applied across the head surface 125. The small gap portion 220 is sufficiently narrow to avoid unwanted flow interference across the head surface 125. The head surface 125 of the sensing head 120 is exposed outside the sensor housing 200. Thus, the head surface 125 is directly in contact with the wall shear across the flow surface 350 of a test body 300 (FIG. 3).

The wall shear sensor 10 according to the embodiments previously described may be incorporated into a wall shear measurement system. Referring to FIGS. 1-3, a wall shear measurement system 400 may include a test body 300 having a flow surface 350. The wall shear measurement system 400 may further include at least one sensor housing 200 mounted to the test body 300 and a wall shear sensor 10 as previously described in the at least one sensor housing 200.

For example, the wall shear sensor 10 of the wall shear measurement system 400 may include a floating element 100 fixedly attached to a base 110. The floating element 100 may include a sensing head 120 opposite the base 110, a first flexure 130 between the sensing head 120 and the base 110, and a second flexure 140 between the first flexure 130 and the base 110. The wall shear sensor 10 may further include at least one strain gauge 160*a*, 160*b* coupled to the first flexure 130 to measure a first directional component of wall shear applied across a head surface 125 of the sensing head 120. The wall shear sensor 10 may further include at least one strain gauge 160*c*, 160*d* coupled to the second flexure 140 to measure a second directional component of wall shear applied across the head surface 125 of the sensing head 120.

In the wall shear sensor 10 of the wall shear measurement system 400, the first flexure 130 is oriented along a first transverse axis 30, the second flexure 140 is oriented along a second transverse axis 40, and the first transverse axis 30 and the second transverse axis 40 define an offset angle θ greater than 0° and less than 180°, or from greater than 0° to 90°, or from 30° to 150°, or from 45° to 135°, or from 60° to 120°, or about 90°, or exactly 90°. The sensor housing 200 laterally surrounds the floating element 100, such that an interior space 210 laterally surrounding the floating element 100 is defined between the floating element 100 and the sensor housing 200. The interior space 210 includes a small gap portion 220 laterally surrounding the sensing head 120 of the floating element 100. The head surface 125 of the sensing head 120 is exposed outside the sensor housing 200. In some embodiments of the wall shear measurement system 400, the head surface 125 of the sensing head 120 of the wall shear sensor 10 is coplanar with the flow surface 350 of the test body 300.

Figure 6:
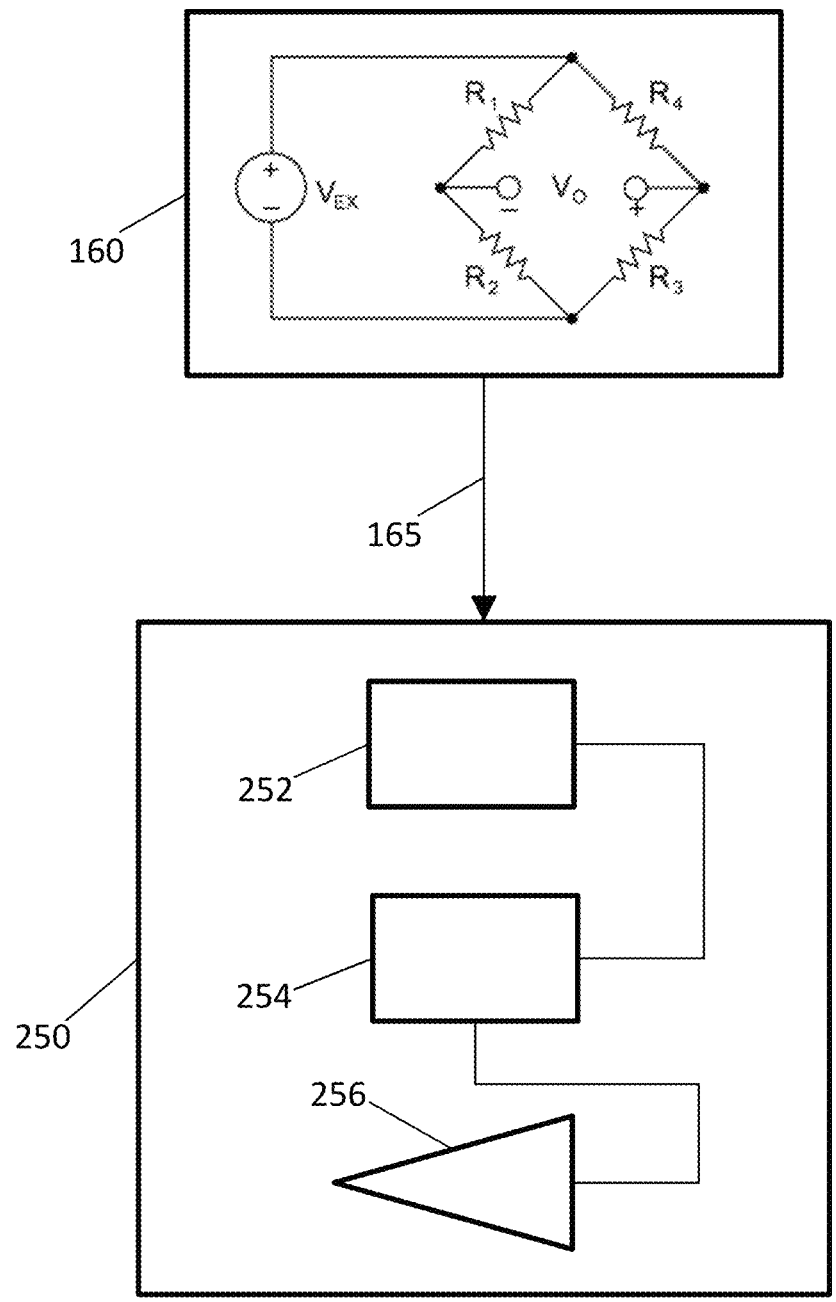
FIG. 6 is a schematic diagram of a data acquisition system of a wall shear measurement system comprising a wall shear sensor according to one or more embodiments described herein.

Referring to FIG. 6, the wall shear measurement system 400 may further include a data acquisition system 250 communicatively coupled to the strain gauges 160 of the wall shear sensor 10 through a communication path 165. The data acquisition system 250 may include at least one of a memory module 252, a processor 254, a signal conditioner 256, or a combination thereof. These components may be arranged in a circuit in any order to achieve a desired result or function. Thus, it should be understood that the schematic of the data acquisition system 250 is not intended to limit the ordering or interconnection of the components to a specific configuration. The communication path 165 may include conductive wires, conductive traces, optical waveguides, or a combination thereof. The strain gauges 160 may be chosen from semiconductor strain gauges, foil strain gauges, piezoelectric elements, or piezoresistive elements, microelectromechanical (MEM) devices, capacitors, for example, and may be configured in one or more Wheatstone bridges or may be configured in quarter-bridge, half-bridge, or full-bridge arrangements with dummy resistors, depending on the number of strain gauges present.

In some embodiments, the wall shear measurement system 400 may include a plurality of wall shear sensors, each wall shear sensor being disposed within a respective sensor housing mounted to the test body. The plurality of wall shear sensors in such embodiments may be networked in a manner that enables simultaneous data acquisition and interpretation from each of the individual wall shear sensors.

Still referring to FIG. 6, electrical signals generated at the strain gauges 160 may be processed by a data acquisition system 250 having at least one memory module 252, at least one processor 254, and/or one or more signal conditioners 256. Each of these components may be connected to the strain gauges 160 through a communication path 165. The at least one processor 254 may be any device capable of executing machine readable instructions. For example, the at least one processor 254 may be a controller, an integrated circuit, a microchip, a computer, or any other computing device. The at least one processor 254 may be communicatively coupled to a communication path 165 that provides signal interconnectivity between various components of the wall shear sensor 10. Thus, the communication path 165 may communicatively couple any number of processors with one another and may allow the various components coupled to the communication path 165 to operate in a distributed computing environment. Specifically, each of the components may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, for example. The signal conditioner 256 may include any electronic device capable of providing filtering, amplifying, electrical isolation, excitation, linearization, cold junction compensation, or attenuation, for example.

Moreover, the communication path 165 may be formed from any medium that is capable of transmitting a signal such as, for example, conductive wires, conductive traces, optical waveguides, or the like. In some embodiments, the communication path 165 may facilitate the transmission of wireless signals, such as WiFi, Bluetooth, and the like. Moreover, the communication path 165 may be formed from a combination of media capable of transmitting signals. In one embodiment, the communication path 165 may include a combination of conductive traces, conductive wires, connectors, and buses that cooperate to permit the transmission of electrical data signals to components such as processors, memories, sensors, input devices, output devices, and communication devices. Accordingly, the communication path 165 may include a vehicle bus, such as for example a LIN bus, a CAN bus, a VAN bus, or the like. Additionally, it is noted that the term "signal" may include a waveform (for example, electrical, optical, magnetic, mechanical or electromagnetic), such as DC, AC, sinusoidal-wave, triangular-wave, square-wave, vibration, and the like, capable of traveling through a medium.

The wall shear sensor 10 of the wall shear measurement system 400 may further include at least one memory module 252 coupled to the communication path 165. The at least one memory module 252 may include RAM, ROM, flash memories, hard drives, or any device capable of storing machine readable instructions such that the machine readable instructions can be accessed by the at least one processor 254. The machine readable instructions may include logic or algorithm(s) written in any programming language of any generation (e.g., 1GL, 2GL, 3GL, 4GL, or 5GL) such as, for example, machine language that may be directly executed by the at least one processor 254, or assembly language, object-oriented programming (OOP), scripting languages, microcode, etc., that may be compiled or assembled into machine readable instructions and stored on the at least one memory module 252. Alternatively, the machine readable instructions may be written in a hardware description language (HDL), such as logic implemented via either a field-programmable gate array (FPGA) configuration or an application-specific integrated circuit (ASIC), or their equivalents. The signal conditioner 256 may be configured to filter the signal, isolate possible sources of signal perturbations, and amplify the power of an electrical signal produced by the strain gauges 160. In some embodiments, the data acquisition system 250 may not include a separate signal conditioner 256 where at least one processor 254 is programmed to condition the signal obtained from the strain gauges 160. In some embodiments, additional electronic packages may be used in place of, or in conjunction with a signal conditioner 256 to boost the signal level, increase measurement resolution and improve signal-to-noise ratios.

To further illustrate without limitation the embodiments of the wall shear sensor 10 and the wall shear measurement system 400 including the wall shear sensor 10, the general principles of operation for the wall shear sensor 10, along with exemplary methods for interpreting data from the wall shear sensor, will now be described with reference to FIGS. 7-11.

Figure 7:
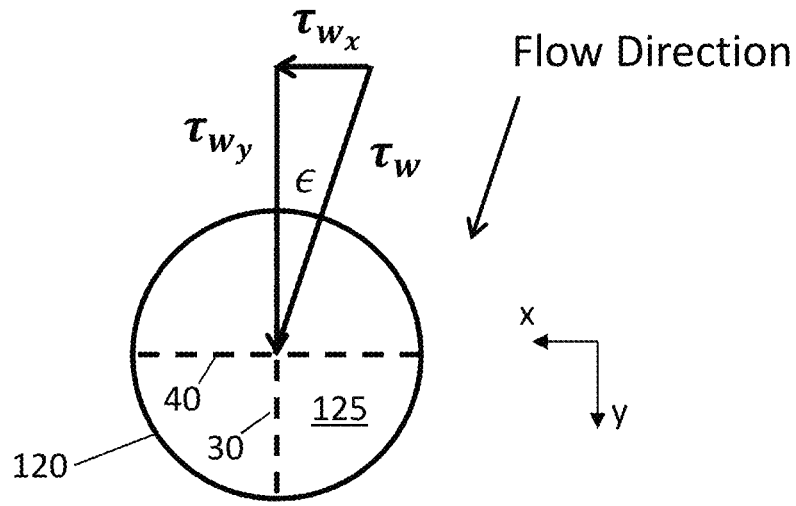
FIG. 7 is a diagram of test variables used to interpret data from a wall shear sensor according to one or more embodiments described herein.

FIG. 7 schematically illustrates the sensing head 120 of the floating element 100 of the wall shear sensor 10 (see FIG. 4) and the head surface 125 of the sensing head 120. When a fluidic flow, for example a flow of a gas such as air or a of liquid such as water, passes over the sensing head 120 in the direction indicated in FIG. 7 (i.e., with a cross-flow at an angle $\epsilon$ relative to a transverse axis y of the floating element 100, a total wall shear $\tau_w$ is applied to the floating element 100. The total wall shear $\tau_w$ has a stream-wise wall shear component $\tau_{wy}$ in the y direction and a transverse flow wall shear component $\tau_{wx}$ in the x direction. It should be apparent from the equations in FIG. 7 that if the stream-wise wall shear component $\tau_{wy}$ and the transverse flow wall shear component $\tau_{wx}$ are empirically measured by the wall shear sensor 10 through interpretation of data from the strain gauges 160, for example, that both the total wall shear $\tau_w$ and the cross-flow angle $\epsilon$ can be derived. In some instances, the cross-flow angle $\epsilon$ can also be interpreted as the "up-wash angle."

Figure 8A:
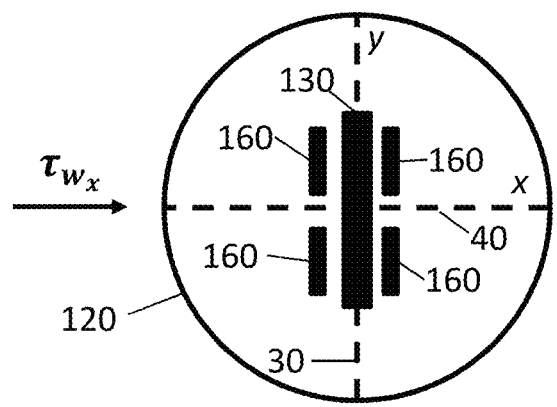
FIG. 8A is a schematic of a strain gauge configuration on a first flexure of the floating element of a wall shear sensor according to one or more embodiments described herein.
Figure 8B:
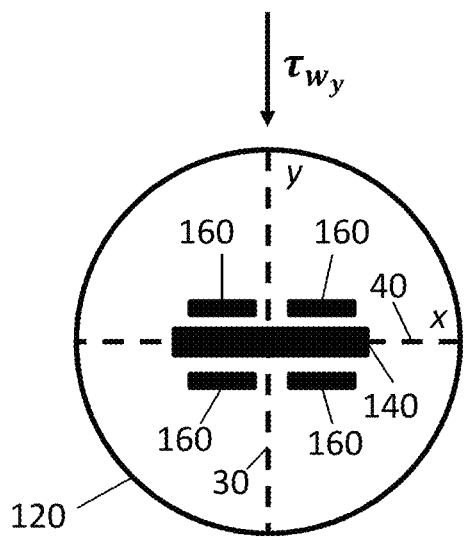
FIG. 8B is a schematic of a strain gauge configuration on a second flexure of the floating element of a wall shear sensor according to one or more embodiments described herein.

In FIGS. 8A and 8B, the y-direction illustrated in FIG. 7 may be the first transverse axis 30 of the floating element 100, and the x-direction illustrated in FIG. 7 may be the second transverse axis 40 of the floating element 100. The first flexure 130 is oriented parallel to the first transverse axis 30 (FIG. 8A), and the second flexure 140 is oriented parallel to the second transverse axis 40 (FIG. 8B). The stream-wise wall shear component $\tau_{wy}$ thus is the component of the wall shear in the direction of the first transverse axis 30 (FIG. 8B) and the transverse flow wall shear component $\tau_{wx}$ thus is the component of the wall shear in the direction of the second transverse axis 40 (FIG. 8A).

Because in the illustration of FIGS. 8A and 8B the first flexure 130 is offset by 90° from the second flexure 140, the transverse flow wall shear component $\tau_{wx}$ effects only the first flexure 130, causing the first flexure 130 to bend or sway in the direction parallel to the second transverse axis 40 without causing the second flexure 140 to bend or sway. Likewise, the stream-wise wall shear component $\tau_{wy}$ effects only the second flexure 140, causing the second flexure 140 to bend or sway in the direction parallel to the first transverse axis 30 without causing the first flexure 130 to bend or sway.

It should be understood that if the offset angle $\theta$ is other than 90° (embodiment not shown), the stream-wise wall shear component $\tau_{wy}$ and the transverse flow wall shear component $\tau_{wx}$ both contribute to the amount of bending or swaying of both the first flexure 130 and the second flexure 140. Thus, for the embodiment shown, in which the offset angle $\theta$ is exactly 90°, the strain gauges 160 on the first flexure 130 (FIG. 8A) send electrical signals proportional to the strain induced by the transverse flow wall shear component $\tau_{wx}$, while the strain gauges 160 on the second flexure 140 (FIG. 8B) send electrical signals proportional to the strain induced by the stream-wise wall shear component $\tau_{wy}$.

FIGS. 9A-11B illustrate the interpretation of strain measurements from a wall shear sensor 10 according to embodiments of this disclosure.

Figure 9A:
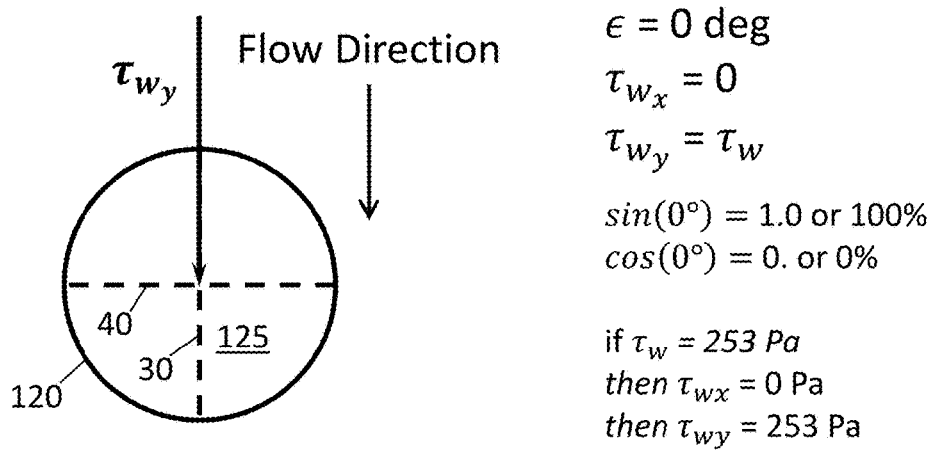
FIG. 9A is a schematic of a simulated measurement using a wall shear sensor according to one or more embodiments described herein.

FIG. 9A schematically depicts a flow pattern at a cross-flow angle $\epsilon$ of 0°, such that only a stream-wise wall shear component $\tau_{wy}$ exists. As depicted on the graph of FIG. 9B, for a simulated total wall shear of 253 Pa, the transverse flow wall shear component $\tau_{wx}$ measured by the first flexure 130 is zero, and the stream-wise wall shear component $\tau_{wy}$ measured by the second flexure 140 is 253 Pa.

Figure 10A:
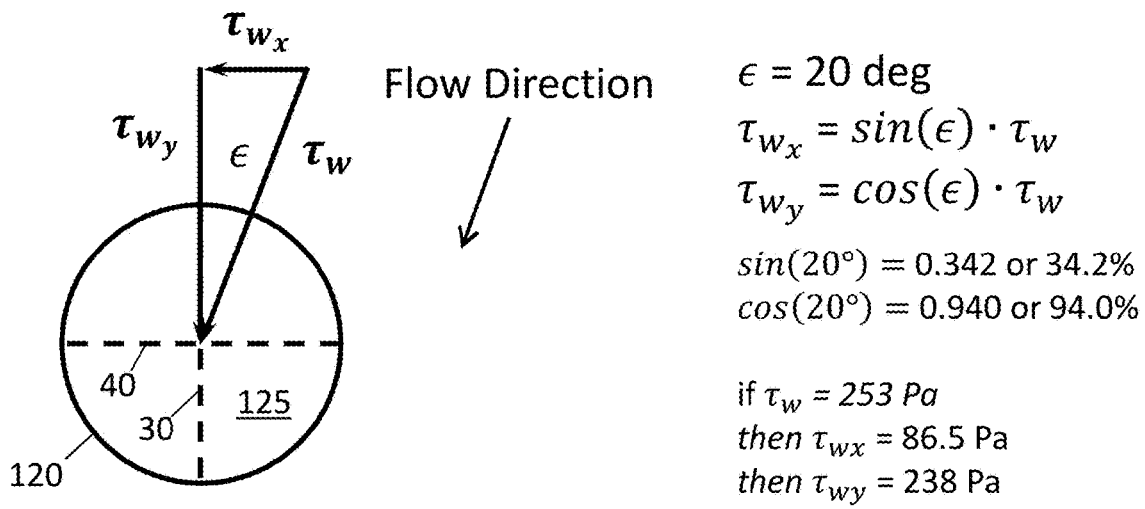
FIG. 10A is a schematic of a simulated measurement using a wall shear sensor according to one or more embodiments described herein.

FIG. 10A schematically depicts a flow pattern at a cross-flow angle $\epsilon$ of 20°, such that both a stream-wise wall shear component $\tau_{wy}$ and a non-zero transverse flow wall shear component $\tau_{wx}$ are present. As depicted on the graph of FIG.

10B, for a simulated total wall shear of 253 Pa, the transverse flow wall shear component $\tau_{wx}$ measured by the first flexure 130 is 86.5 Pa, and the stream-wise wall shear component $\tau_{wy}$ measured by the second flexure 140 is 238 Pa.

Figure 11A:
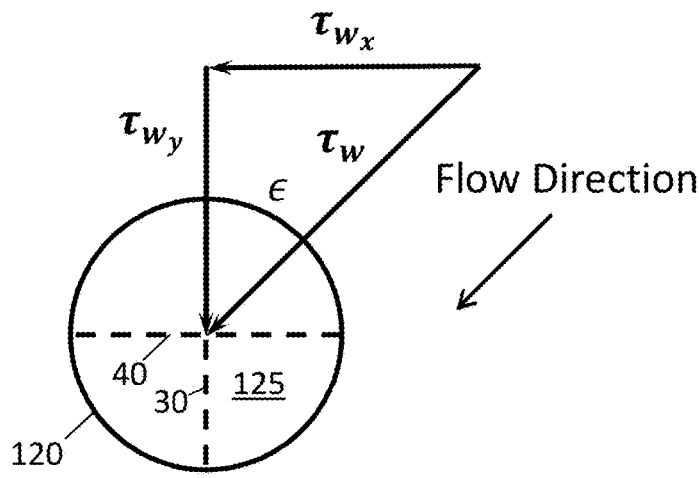
FIG. 11A is a schematic of a simulated measurement using a wall shear sensor according to one or more embodiments described herein.

FIG. 11A schematically depicts a flow pattern at a cross-flow angle $\epsilon$ of 45°, such that the stream-wise wall shear component $\tau_{wy}$ and the transverse flow wall shear component $\tau_{wx}$ are expected to have equal magnitudes. As depicted on the graph of FIG. 11B, for a simulated total wall shear of 253 Pa, the transverse flow wall shear component $\tau_{wx}$ measured by the first flexure 130 is 179 Pa, and the stream-wise wall shear component $\tau_{wy}$ measured by the second flexure 140 is 179 Pa.

Figure 9B:
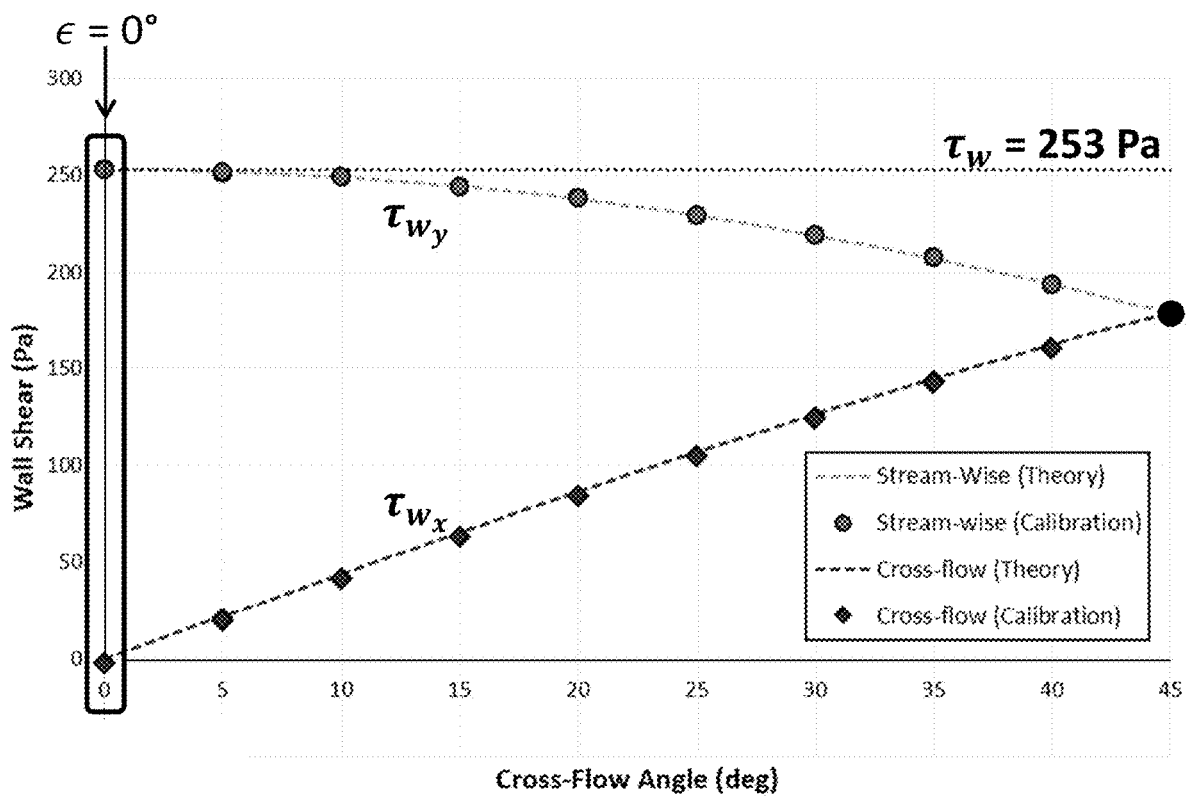
FIG. 9B is a calibration plot for the wall shear sensor highlighting data from the simulated measurement of FIG. 9A.
Figure 10B:
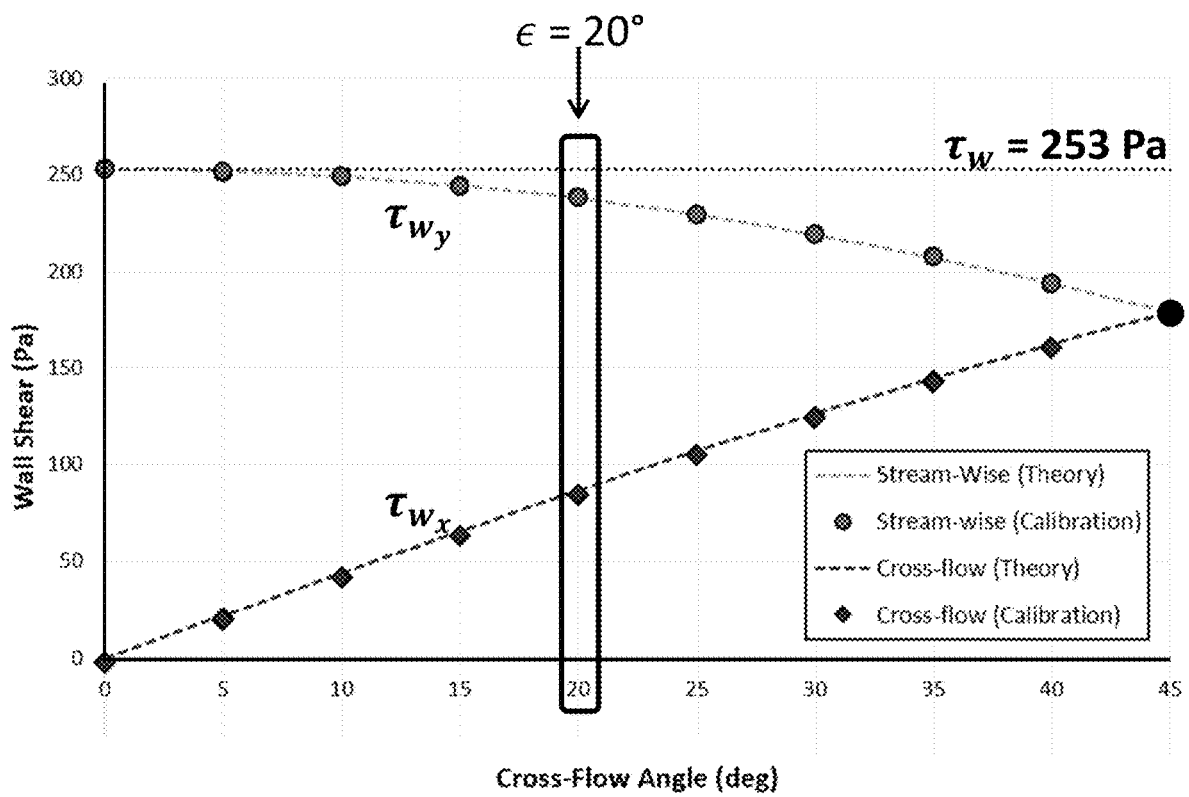
FIG. 10B is a calibration plot for the wall shear sensor highlighting data from the simulated measurement of FIG. 10A.
Figure 11B:
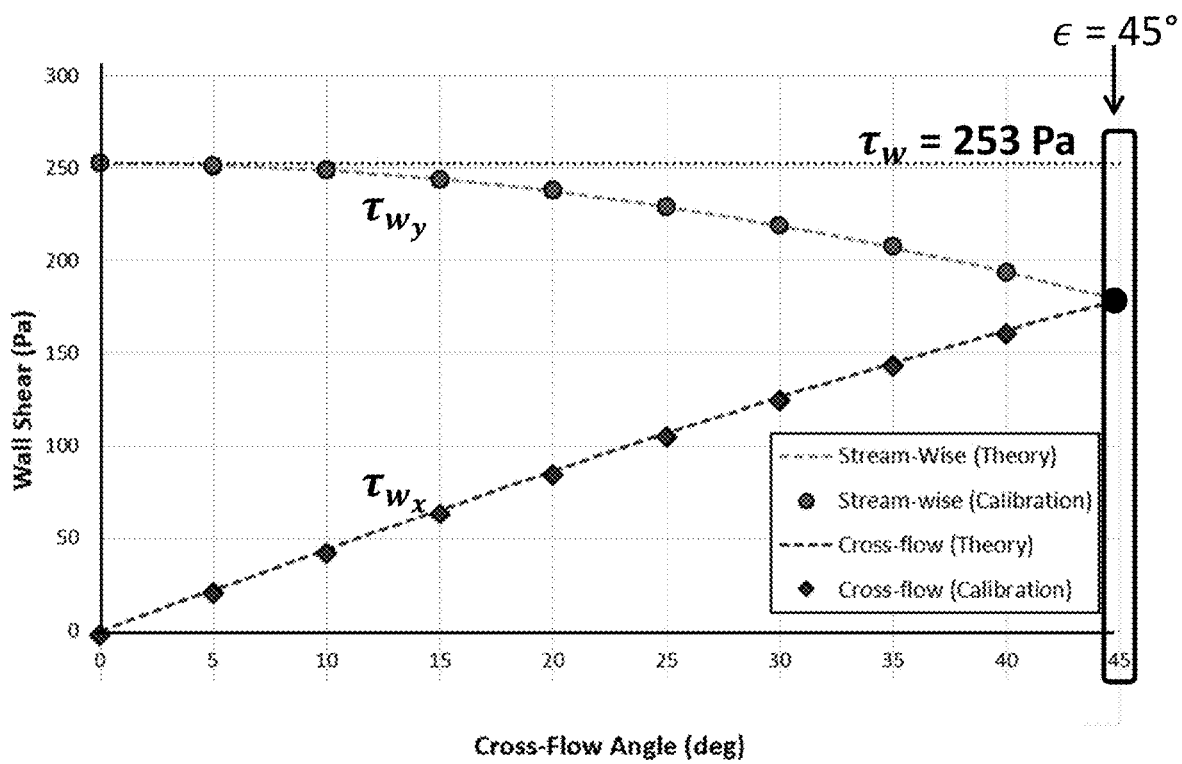
FIG. 11B is a calibration plot for the wall shear sensor highlighting data from the simulated measurement of FIG. 11A.

It should be understood that calibration curves such as those of FIGS. 9B, 10B, and 11B may be applied to interpret data from the strain gauges 160 of the wall shear sensor 10. From the calibration curves, for every cross-flow angle $\epsilon$, there is a unique ratio of $\tau_{wy}$ to $\tau_{wx}$, because $\tau_{wy}/\tau_{wx}$ is proportional to $\cos(\epsilon)/\sin(\epsilon)$. Thus, cross-flow angle $\epsilon$ (i.e., the flow direction) is easily derived from $\tau_{wy}$ and $\tau_{wx}$. Furthermore, the net wall shear (i.e., the flow magnitude) is easily derived from the relationship $\tau_w = (\tau_{wx}^2 + \tau_{wy}^2)^{0.5}$. Thus, the wall shear sensor 10 according to embodiments of this disclosure may be used reliably and accurately to directly measure both the direction and the magnitude of wall shear acting on the wall shear sensor 10.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

What is claimed is:

1. A wall shear sensor comprising:
a floating element fixedly attached to a base, the floating element having a sensing head opposite the base, a first flexure between the sensing head and the base and being along a longitudinal axis of the floating element defined perpendicular to the base, and a second flexure between the first flexure and the base and being along the longitudinal axis; and
at least one strain gauge coupled to the first flexure to measure a first directional component of wall shear applied across a head surface of the sensing head;
at least one strain gauge coupled to the second flexure to measure a second directional component of wall shear applied across the floating element surface of the sensing head,
wherein:
the first flexure is oriented parallel to a first transverse axis of the floating element, the first transverse axis being perpendicular to the longitudinal axis;
the second flexure is oriented parallel to a second transverse axis of the floating element, the second transverse axis being perpendicular to the longitudinal axis;
the first transverse axis and the second transverse axis define an offset angle; and
the offset angle is from greater than 0° to less than 180°.

2. The wall shear sensor of claim 1, wherein the offset angle is from 30° to 150°.

3. The wall shear sensor of claim 1, wherein the offset angle is 90°.

4. The wall shear sensor of claim 1, wherein:
the first flexure comprises a first front surface and a first rear surface opposite the first front surface; and
the second flexure comprises a second front surface and a second rear surface opposite the second front surface.

5. The wall shear sensor of claim 4, comprising:
at least one strain gauge mounted to either the first front surface or the first rear surface of the first flexure; and
at least one strain gauge mounted to either the second front surface or the second rear surface of the second flexure.

6. The wall shear sensor of claim 4, comprising:
at least one strain gauge mounted to the first front surface of the first flexure;
at least one strain gauge mounted to the first rear surface of the first flexure;
at least one strain gauge mounted to the second front surface of the second flexure; and
at least one strain gauge mounted to the second rear surface of the second flexure.

7. The wall shear sensor of claim 1, wherein the floating element further comprises a neck portion between the first flexure and the sensing head.

8. The wall shear sensor of claim 1, wherein the head surface is circular.

9. The wall shear sensor of claim 1, wherein the strain gauges are chosen from semiconductor strain gauges, foil strain gauges, piezoelectric elements, piezoresistive elements, microelectromechanical (MEM) devices, capacitors, or combinations thereof.

10. The wall shear sensor of claim 1, wherein:
the wall shear sensor further comprises a sensor housing that laterally surrounds the floating element;
an interior space laterally surrounding the floating element is defined between the floating element and the sensor housing;
the interior space comprises a small gap portion laterally surrounding the sensing head of the floating element; and
the head surface of the sensing head is exposed outside the sensor housing.

11. The wall shear sensor of claim 1, wherein:
the first flexure enables the floating element to sway or pivot in a direction perpendicular to the first transverse axis when a shear force having the first directional component is applied across the head surface; and
the second flexure enables the floating element to sway or pivot in a direction perpendicular to the second transverse axis when a shear force having the second directional component is applied across the head surface.

12. A wall shear measurement system comprising:
a test body having a flow surface;
at least one sensor housing mounted to the test body; and
a wall shear sensor in the at least one sensor housing, the wall shear sensor comprising:
a floating element fixedly attached to a base, the floating element having a sensing head opposite the base, a first flexure between the sensing head and the base and being along a longitudinal axis of the floating element defined perpendicular to the base, and a second flexure between the first flexure and the base and being along the longitudinal axis; and at least one strain gauge coupled to the first flexure to measure a first directional component of wall shear applied across a floating element surface of the sensing head;

at least one strain gauge coupled to the second flexure to measure a second directional component of wall shear applied across the floating element surface of the sensing head, wherein:
the first flexure is oriented along a first transverse axis of the floating element, the first transverse axis being perpendicular to the longitudinal axis;

the second flexure is oriented along a second transverse axis of the floating element, the second transverse axis being perpendicular to the longitudinal axis;

the first transverse axis and the second transverse axis define an offset angle;

the offset angle is from greater than 0° to less than 180°;

the sensor housing laterally surrounds the floating element;

an interior space laterally surrounding the floating element is defined between the floating element and the sensor housing;

the interior space comprises a small gap portion laterally surrounding the sensing head of the floating element;

the head surface of the sensing head is exposed outside the sensor housing.

13. The wall shear measurement system of claim 12, wherein the head surface of the sensing head is coplanar with the flow surface.

14. The wall shear measurement system of claim 12, further comprising a data acquisition system communicatively coupled to the strain gauges of the wall shear sensor through a communication path.

15. The wall shear measurement system of claim 14, wherein the data acquisition system comprises at least one of a memory module, a processor, a signal conditioner, or a combination thereof.

16. The wall shear measurement system of claim 14, wherein the communication path comprises conductive wires, conductive traces, optical waveguides, or a combination thereof.

17. The wall shear measurement system of claim 12, wherein the strain gauges are chosen from semiconductor strain gauges, foil strain gauges, piezoelectric elements, piezoresistive elements, microelectromechanical (MEM) devices, capacitors, or combinations thereof.

18. The wall shear measurement system of claim 12, wherein:
the first flexure enables the floating element to sway or pivot in a direction perpendicular to the first transverse axis when a shear force having the first directional component is applied across the head surface; and the second flexure enables the floating element to sway or pivot in a direction perpendicular to the second transverse axis when a shear force having the second directional component is applied across the head surface.

19. The wall shear measurement system of claim 12, wherein:
the first flexure comprises a first front surface and a first rear surface opposite the first front surface; and the second flexure comprises a second front surface and a second rear surface opposite the second front surface.

20. The wall shear measurement system of claim 19, comprising:
at least one strain gauge mounted to either the first front surface or the first rear surface of the first flexure; and at least one strain gauge mounted to either the second front surface or the second rear surface of the second flexure.

* * * * *